United States Patent
Takegami

(10) Patent No.: US 7,292,081 B2
(45) Date of Patent: Nov. 6, 2007

(54) PULSE GENERATOR

(75) Inventor: Eiji Takegami, Tokyo (JP)

(73) Assignee: Densei-Lambda Kabushiki Kaisha (JP)

( * ) Notice: Subject to any disclaimer, the term of this patent is extended or adjusted under 35 U.S.C. 154(b) by 337 days.

(21) Appl. No.: 10/543,534

(22) PCT Filed: May 19, 2004

(86) PCT No.: PCT/JP2004/006730

§ 371 (c)(1),
(2), (4) Date: Jul. 27, 2005

(87) PCT Pub. No.: WO2004/105222

PCT Pub. Date: Dec. 2, 2004

(65) Prior Publication Data

US 2006/0076994 A1  Apr. 13, 2006

(30) Foreign Application Priority Data

May 22, 2003  (JP) .............................. 2003-145428

(51) Int. Cl.
H03K 3/017 (2006.01)
(52) U.S. Cl. ...................................... 327/172; 327/291
(58) Field of Classification Search ........ 327/172–177, 327/291–299
See application file for complete search history.

(56) References Cited

U.S. PATENT DOCUMENTS 5,272,614 A    12/1993  Brunk et al. ................... 363/21
6,107,850 A *  8/2000  Shimizu ...................... 327/172
7,157,889 B2 * 1/2007  Kernahan et al. ........... 323/268

FOREIGN PATENT DOCUMENTS

JP  04-322161      11/1992
JP  2002-218750 A  8/2002
JP  2003-088105 A  3/2003
JP  2003-111400 A  4/2003

* cited by examiner

Primary Examiner—Linh My Nguyen
(74) Attorney, Agent, or Firm—Akerman Senterfitt

(57) ABSTRACT

Without shortening clock pulse duration serving as a unit time of a pulse generator, a pulse-width control is possible in which pulse duration varies in increments of a time length shorter than the unit time. A time width Ton_s of a pulse width finely dividing signal Vs from a DSP 17 varies by clock pulse duration $T_{clk}$ in response to variations in an output voltage Vo. A time control circuit 18 that has received the pulse width finely dividing signal Vs generates, in a control signal Vd, varying segments 30, 31 for making the time width of the pulse drive signal Vg vary by a shorter time $\Delta Td$ than the clock pulse duration $T_{clk}$. Consequently, resolution of the time width of the pulse drive signal Vg is improved so as to be higher than the clock pulse duration $T_{clk}$, which is time resolution of the DSP 17 itself.

7 Claims, 10 Drawing Sheets

PULSE GENERATOR

FIELD OF THE INVENTION

The present invention relates to a pulse generator for generating control pulses. More specifically, the present invention relates to a pulse generator, which is incorporated in for example a switching regulator or a control pulse generating means for a stepping motor to generate the control pulses. In the switching regulator, on duration of a switching element such as a MOSFET is regulated by varying pulse widths (time widths) of control pulses fed from a feedback circuit in response to output voltages to perform switching operation of the switching element for stabilizing the output voltages, while in the stepping motor, similar variable pulse-width control is applied to regulate revolution speeds and rotation angles.

RELATED ART

One of the representatives of conventional devices utilizing a pulse generator for generating this sort of control pulse is a switching regulator. Such a switching regulator is configured, as shown in Japanese Un-Examined patent publication No. 4-322161, such that a difference between an output voltage under monitoring in the switching regulator with a switching element and a reference voltage generated in a reference voltage supplying circuit, is converted into digital data through a feedback circuit; and then a feedback amount contained in the digital data is processed so as to be synchronized with clock signals from an oscillation circuit, so that control signals generated by converting thus obtained processed data into analogous data levels are supplied from the feedback circuit to a drive circuit, whereby pulse drive signals are supplied to the switching element as the control pulses whose widths (time widths) vary in response to an output voltage, thus stabilizing the output voltage. The above Japanese patent publication also suggests that frequencies generated in the oscillation circuit may increase at the time of a transient response in which the output voltage varies abruptly, whereas when the output voltage is comparatively stable, the frequencies generated in the oscillation circuit may decrease, thus improving transient response characteristics when the output voltage varies abruptly.

DISCLOSURE OF THE INVENTION

According to the above-described switching regulator in which a switching element performs switching operation by control signals fed from a feedback circuit, if pulse drive signals from a switching element drive circuit are generated based on clock signal counts in a pulse generator as shown in FIG. 10, for example, then rising edges and falling edges of the pulse drive signals are synchronized, for example, with the rising edges and falling edges of the counts that vary in a stepwise manner. Hence, a minimal variation in on duration of the pulse drive signal is limited inevitably by clock pulse duration $T_{clk}$ of the pulse generator. Therefore, when one period of the pulse drive signal and an input voltage are defined as $T_{sw}$ and Vi, respectively in a step-down power converter for outputting a lower voltage than an input voltage, the minimal variation $\Delta V_o$ in output voltage is expressed by the following formula (1).

$$\Delta Vo = Vi \cdot \frac{Tclk}{Tsw} \quad (1)$$

As is clear from the formula (1), however, if switching frequencies of the converter are increased i.e., the period $T_{sw}$ of the pulse drive signal is decreased in order to downsize a body of the switching regulator, the minimal variation $\Delta V_o$ in the output voltage under monitoring, for example, is increased, so that a problem has heretofore arisen that a setting accuracy of output voltage gets rough unless the clock pulse duration $T_{clk}$ of the pulse generator is shortened. In order to shorten the clock pulse duration $T_{clk}$, the frequencies of the oscillation circuit provided in the pulse generator must be lowered, thus resulting in substantial changes in design being required.

In view of the problem described above, it is an object of the present invention to provide a pulse generator which is capable of performing a pulse-width control in increments of time shorter than a unit time of the pulse generator without shortening the clock pulse duration serving as the unit time.

MEANS FOR SOLVING THE PROBLEM

According to a first aspect of the present invention, there is provided a pulse generator for generating control pulses with varied pulse widths, comprising: a variable signal output means for outputting a pulse width dividing signal whose time width varies every unit time; and a time control means for detecting variations in a time width of the pulse width dividing signal to allow a pulse width of the control pulse to be varied in increments of a time shorter than the unit time.

In this case, the time width of the pulse width dividing signal from the variable signal output means varies by a unit time. The time control means that has received the pulse width dividing signal, however, can make the pulse width of the control pulse, which is the time width thereof, vary in increments of a time length shorter than the unit time. Hence, resolution of the pulse width of the control pulse is improved so as to be higher than a clock time width (clock pulse duration) of the unit time serving as time resolution of the pulse generator itself. Hence, without taking the trouble to shorten the clock pulse duration serving as the unit time of the pulse generator, simply adding the time control means enables a pulse-width control to be carried out in increments of a time length shorter than the unit time.

Further, in the pulse generator of the present invention, a pulse width dividing signal output from the variable signal output means comprises a pulse width roughly dividing signal with a time width, which is approximately equal to the pulse width of the control pulse and a pulse width finely dividing signal for regulating the pulse width of the control pulse by the unit time. The time control means determines approximately the pulse width of the control pulse by the pulse width roughly dividing signal to regulate the pulse width of the control pulse in increments of a time length shorter than the unit time by means of the pulse width finely dividing signal.

Consequently, the time control means determines approximately the pulse width as the control pulse time width, by the pulse width roughly dividing signal generated from the variable signal output means, so that the pulse width of the control pulse can be delicately regulated by a pulse width finely dividing signal obtained from the same variable signal output means. Therefore, the time control means can allow the pulse width of the control pulse to be varied in increments of a time length shorter than the unit time by means of a couple of the pulse width dividing signals generated from the variable signal output means.

Further, in the pulse generator of the present invention, the variable signal output means is configured so as to output the pulse width finely dividing signal ahead of the pulse width roughly dividing signal. Besides, the time control means regulates a pulse width of the control pulse in increments of a time length shorter than the unit time after the pulse width roughly dividing signal has been output.

Accordingly, the pulse width as the control pulse time width is delicately regulated after the pulse width finely dividing signal is output and then the pulse width roughly dividing signal is output. Hence, the pulse width of the control pulse is defined after the pulse width finely dividing signal and the pulse width roughly dividing signal are output. Consequently, the pulse width of the control pulse can be prevented from lengthening unnecessarily.

Furthermore, the pulse generator of the present invention is provided with a pulse generating means for generating the control pulse when an input voltage exceeds a predetermined threshold value. When the output of the pulse width roughly dividing signal is initiated, the time control means generates a pulse generating signal for raising a voltage level depending on the pulse width finely dividing signal at a predetermined gradient with the pulse generating signal superposed on the voltage level, and then by turning the pulse generating signal into the above-mentioned input voltage, the time control means regulates the pulse width of the control pulse in increments of a time length shorter than the unit time.

Thus, the pulse generating signal generated from the variable signal output means and the threshold value set in the pulse generating means determine the pulse width that is the control pulse time width. The longer the time elapsing from output initiation of the pulse width finely dividing signal to the subsequent output initiation of the pulse width roughly dividing signal becomes, the shorter the lag time becomes, the lag time being required for the pulse generating signal to reach the threshold value after the output of the pulse width roughly dividing signal is initiated. Hence, timing to initiate the generation of the control pulse gets earlier, thus enabling the pulse width of the control pulse to be delicately regulated by varying the timing to initiate an output of the pulse width finely dividing signal. Accordingly, the pulse width of the control pulse can vary in increments of a time length shorter than the unit time by means of a couple of the pulse width dividing signals generated from the variable signal output means and by means of the threshold value set in the pulse generating means.

Also, the pulse generator of the present invention is provided with a pulse generating means for generating the control pulse when an input voltage exceeds a predetermined threshold value, wherein the pulse width roughly dividing signal begins to be output, the time control means generates a pulse generating signal for lowering a voltage level depending on the pulse width finely dividing signal at a predetermined gradient from a peak value exceeding the threshold value with the pulse generating signal superposed on the voltage level, and then by turning the pulse generating signal into the input voltage, the time control means regulates the pulse width of the control pulse in increments of a time length shorter than the unit time.

Thus, the pulse generating signal generated from the variable signal output means and the threshold value set in the pulse generating means determine the pulse width that is the control pulse time width. The longer the time elapsing from output initiation of the pulse width finely dividing signal to the subsequent output initiation of the pulse width roughly dividing signal becomes, the higher the peak value at the time of the output initiation of the pulse width roughly dividing signal becomes, so that the time required for the pulse generating signal to fall to the threshold value lengthens. In other words, by varying the timing of the output initiation of the pulse width finely dividing signal, the timing for the accomplishment of the control pulse generation is varied, so that the pulse width of the control pulse can be delicately regulated. Accordingly, by a couple of the pulse width dividing signals generated from the variable signal output means as well as by the threshold value set in the pulse generating means, the pulse width of the control pulse can vary in increments of a time length shorter than the unit time.

Furthermore, in the pulse generator of the present invention, the time control means is provided with a bias voltage generating means for generating a voltage level depending on the pulse width finely dividing signal when the pulse width roughly dividing signal begins to be output.

Thus, when the pulse width roughly dividing signal begins to be output, the bias voltage generating means can supply the voltage level (corresponding to a kind of a segment) depending on the pulse width finely dividing signal to the pulse generating signal, so that the pulse width of the control pulse can be delicately regulated even if the pulse width finely dividing signal comprising a group of on pulses each of which is different in on time or in period is output by the unit time from the variable signal output means.

Moreover, in the pulse generator of the present invention that generates a control pulse that varies in pulse width, there are provided a variable signal output means for outputting a pulse width roughly dividing signal with a time width, which is approximately equal to the pulse width of the control pulse and a pulse width finely dividing signal whose phase difference from the phase of the pulse width preliminary division signal varies by the unit time, and a time control means for detecting variations in the phase difference to make the pulse width of the control pulse vary in increments of a time length shorter than the unit time.

In this case, the pulse width finely dividing signal from the variable signal output means varies by the unit time in the phase difference from the pulse width roughly dividing signal. However, since the time control means receives the phase difference and can make the pulse width, which is the control pulse time width, vary in increments of a time length shorter than the unit time, resolution of the pulse width of the control pulse is improved higher than the clock pulse duration of the unit time, which is the time resolution of the pulse generator itself. Consequently, even if not bothering to shorten the clock pulse duration serving as the unit time of the pulse generator itself, only addition of the time control means enables a pulse-width control in which pulse duration varies in increments of a time length shorter than the unit time by means of a couple of the pulse width dividing signal generated from the variable signal output means.

Further, in the pulse generator of the present invention that generates the control pulse that varies in pulse width, there are provided a pulse generating means for generating the control pulse when an input voltage exceeds a predetermined threshold value, an operating voltage regulating means for regulating an operating voltage level, and a time control means for generating a pulse generating signal for sloping a voltage level with an operating voltage defined as an upper limit to regulate the pulse width of the control pulse by making the pulse generating signal into the input voltage.

In this case, the pulse generating signal supplied from the time control means to the pulse generating means rises aslope or falls aslope in voltage level with the operating voltage defined as the upper limit. As the operating voltage, however, varies, a pulse-width control is possible in which pulse duration can vary in increments of a time length shorter than a unit time independently of the unit time even if the pulse generating signal is obtained based on the pulse width dividing signals that varies by the unit time.

Furthermore, in the pulse generator of the present invention that generates a control pulse that varies in pulse width, there are provided a pulse generating means for generating the control pulse when an input voltage exceeds a predetermined threshold value, a threshold voltage regulating means for regulating the threshold voltage level, and a time control means for generating a pulse generating signal for sloping a voltage level to regulate the pulse width of the control pulse by making the pulse generating signal into the input voltage.

In this instance, the pulse generating signal supplied from the time control means to the pulse generating means rises aslope and falls aslope in voltage level. However, since the threshold voltage level set by the pulse generating means varies, the pulse-width control is possible in which pulse duration varies in increments of a time length shorter than the unit time independently of the unit time even if the pulse generating signal is obtained based on the pulse width dividing signals that varies by the unit time.

EFFECTS OF THE INVENTION

According to the pulse generator of the present invention, even if not shorten the clock pulse duration serving as the unit time of the pulse generator, the pulse-width control in which pulse duration varies in increments of a time length shorter than the unit time is possible by means of the pulse width dividing signal whose pulse time width varies by the unit time.

Further, according to the pulse generator of the present invention, the pulse width of the control pulse can be allowed to vary in increments of a time length shorter than the unit time by means of the couple of the pulse width dividing signals from the variable signal output means.

Furthermore, according to the pulse generator of the present invention, since the pulse width of the control pulse is defined after the pulse width finely dividing signal and the pulse width roughly dividing signal have been output, the pulse width of the control pulse can be prevented from lengthening uselessly.

Moreover, according to the pulse generator of the present invention, the pulse width of the control pulse can vary in increments of a time length shorter than the unit time by means of the couple of the pulse width dividing signals generated from the variable signal output means and by means of the threshold value set in the pulse generating means.

Further, according to the pulse generator of the present invention, even if the pulse width finely dividing signal comprising the group of the on pulses each of which is different in on time or in period by the unit time are output, the pulse width of the control pulse can be delicately regulated.

Furthermore, according to the pulse generator of the present invention, even if not bothering to shorten the clock pulse duration serving as the unit time of the pulse generator, the pulse-width control in which pulse duration varies in increments of a time length shorter than the unit time is possible by the couple of the pulse width dividing signals by providing a phase difference between the pulse width finely dividing signal and the pulse width roughly dividing signal.

Furthermore, according to the pulse generator of the present invention, even if the pulse generating signal is obtained based on the pulse dividing signal that varies by the unit time, the pulse-width control in which pulse duration varies in increments of a time length shorter than the unit time is possible independently of the unit time by varying the operating voltage level.

Moreover, according to the pulse generator of the present invention, even if the pulse generating signal is obtained based on the pulse dividing signals that varies by the unit time, the pulse-width control in which pulse duration varies in increments of a time length shorter than the unit time is possible independently of the unit time by varying the threshold voltage level set in the pulse generating means.

BEST MODE FOR CARRYING OUT THE INVENTION

Figure 1:
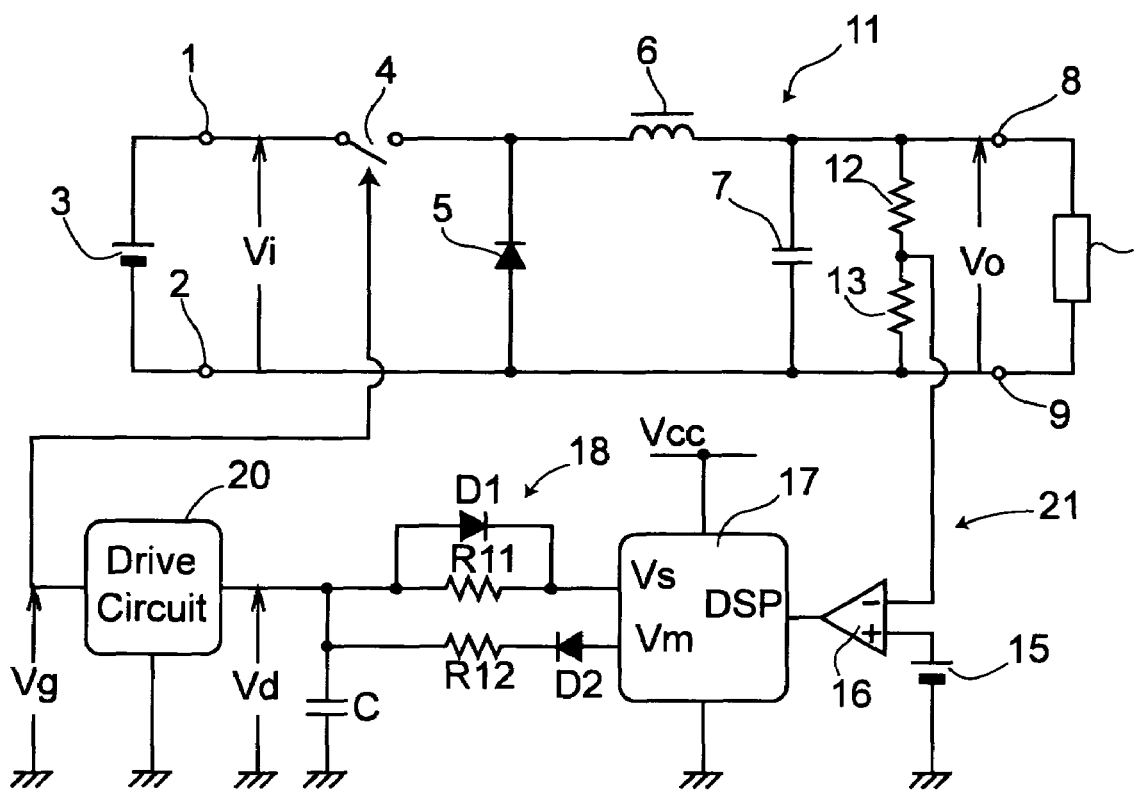
FIG. 1 is a schematic circuit diagram illustrating one example of a switching regulator of the first embodiment in the present invention.

Hereunder is a detailed description of embodiments of a preferable pulse generator of the present invention, in which the same reference numerals are used for parts the same as in each embodiment and common descriptions are omitted for avoiding duplicate descriptions whenever possible.

Embodiment 1

Hereinafter, a switching regulator as one example utilizing a preferable pulse generator of the present invention is described in detail with reference to the accompanying drawings of FIGS. 1 and 2.

In FIG. 1 showing the whole configuration of the switching regulator, reference numerals 1, 2 denote a pair of input terminals across which an input voltage Vi is applied from a DC input source 3. A series circuit of a switching element 4, e.g., a MOSFET or the like and a diode 5 is connected across the input terminals 1, 2 and another series circuit comprising a choke coil 6 and a capacitor 7 is connected across the diode 5. A couple of output terminals 8, 9 are connected across the capacitor 7. Thus, a step-down converter 11 is provided, which comprises the switching element 4, the diode 5, the choke coil 6 and the capacitor 7 to supply an output voltage Vo lower than an input voltage Vi across the input terminals 1, 2 from the output terminals 8, 9 to a load 10. The behavior of the step-down converter 11 is as follows: during an on period of the switching element 4, the diode 5 is turned off and energy is stored in the choke coil 6, whereas during an off period of the switching element 4, the diode 5 is turned on to discharge the energy stored in the choke coil 6. Consequently, the output voltage Vo generated across the smoothing capacitor 7 is supplied from the output terminals 8, 9 to the load 10.

Whilst the non-insulated type step-down converter 11 without a transformer is illustrated in the present embodiment, a non-insulated type step-up converter or a step-up/down converter may be incorporated instead. Alternatively, alternately insulated type converters with a transformer intervened to isolate an input side from an output side (a forward converter, a flyback converter or the like) may be used.

In the present embodiment is provided a feedback circuit 21, corresponding to the pulse generator for stabilizing the output voltage Vo, comprising: voltage dividing resistors 12, 13 serving as an output voltage detecting circuit connected across the output terminals 8, 9 in order to divide the output voltage Vo to output detecting signals; a comparator 16 for comparing a voltage level of the detecting signals with a reference voltage of a reference supply 15 to output a voltage resulting from the comparison; a DSP 17 (Digital Signal Processor) serving as a variable signal output means that receives the compared voltage resulting from the comparator 16 to output a pulse width finely dividing signal Vs whose time width varies by a unit time (a clock pulse duration $T_{clk}$) of reference clock signals; a time control circuit 18 serving as a time control means that detects variations in a time width of the pulse width finely dividing signal Vs, which is output from the DSP 17, by means of time difference between the pulse width finely dividing signal Vs and the pulse width roughly dividing signal Vm, which is output separately from the same DSP 17 to generate varying segments 30, 31 (see FIG. 2) in a control signal Vd serving as a pulse generating signal, the time width of a pulse drive signal supplied to the switching element 4 being allowed to vary in increments of a time length shorter than a unit time of the clock signal by means of first and second varying segments 30, 31; and a drive circuit 20 serving as a pulse generating means that supplies a drive signal Vg of an on pulse to the switching element 4 when the second varying segment 31 of the control signal Vd generated in the time control circuit 18 reaches a threshold value Vd_th. Particularly to be noted in the present embodiment is the fact that such a novel type of time control circuit 18 is provided, that is, the time control circuit 18 in the present embodiment is provided with a function to generate the control signal Vd with smaller variations in pulse duration than a couple of the pulse outputs (the pulse width finely dividing signal Vs and the pulse width roughly dividing signal Vm), from this couple of the pulse outputs that are generated in the DSP 17 and have large variations in pulse duration.

Figure 2:
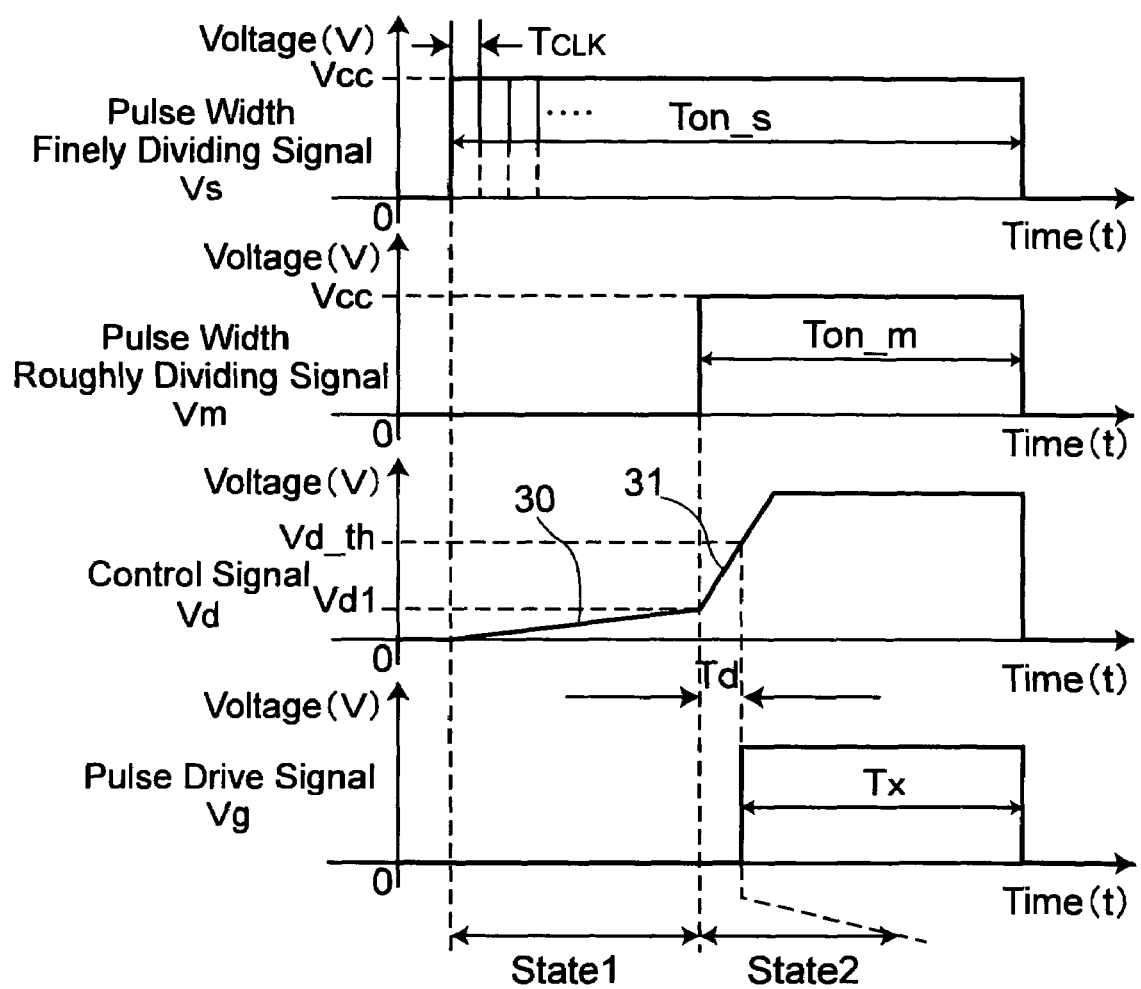
FIG. 2 is a group of waveform charts of each section of the same.

FIG. 2 shows, in the order of top to bottom, waveforms of the pulse width finely dividing signal Vs, the pulse width roughly dividing signal Vm, the control signal Vd and the pulse drive signal Vg, respectively. As is clear from FIG. 2, the pulse width finely dividing signal Vs and the pulse width roughly dividing signal Vm that have the same frequency are output from the DSP 17. An on time $T_{on\_m}$ of the pulse width roughly dividing signal Vm varies due to an abrupt change in the output voltage Vo or the like, while an on time $T_{on\_s}$ of the pulse width finely dividing signal Vs decreases by clock pulse duration $T_{clk}$ when the output voltage Vo as a result of monitoring rises, whereas the on time $T_{on\_s}$ increases by clock pulse duration $T_{clk}$ when the output voltage Vo falls. Further, the falls of the pulse width finely dividing signal Vs and the pulse width roughly dividing signal Vm take place simultaneously, while rising of the pulse width finely dividing signal Vs is variable with variations in the on time $T_{on\_s}$. Additionally, since an operating voltage Vcc is applied to the DSP 17, the pulse width finely dividing signal Vs and the pulse width roughly dividing signal Vm are allowed to output on pulses at the same operating voltage level Vcc.

Next is a description of the configuration of the time control circuit 18, in which a parallel circuit of a resistor R11 and discharging diode D1 connected in parallel to the R 11 with a reverse polarity is connected between a first output terminal of the DSP 17 at which the pulse width finely dividing signal Vs is generated and an input terminal of the drive circuit 20, while a series circuit of another resistor R 12 and a diode D2 for preventing a reverse flow is connected between a second output terminal of the DSP 17 at which the pulse width roughly dividing signal Vm is generated and the input terminal of the drive circuit 20. Further, one terminal of a capacitor C is connected with one ends of R 11 and R 12 that are connected with the input terminal of the drive circuit 20, while the other terminal of the capacitor C is connected with a ground line. A voltage level of a control signal Vd generated in the input terminal of the drive circuit 20 is equal to a voltage across the terminals of the capacitor C.

A series circuit of the resistor R 11 and the capacitor C corresponds to a first time-voltage converting circuit for raising a voltage level of the control signal Vd proportionally to the on time $T_{on\_s}$ of the pulse width finely dividing signal Vs. Further, the series circuit of the resistor R 12 and the capacitor C corresponds to a second time-voltage converting circuit for raising the voltage level of the control signal Vd proportionally to the on time $T_{on\_m}$ of the pulse width roughly dividing signal Vm. As shown in FIG. 2, in a state 1 beginning with the rise of the pulse width finely dividing signal Vs and lasting until the rise of the pulse width roughly dividing signal Vm, the capacitor C is charged by on pulses of the pulse width finely dividing signal Vs via the resistor R 11, so that a first varying segment 30 is formed where the control signal Vd rises aslope from zero. Further, in a state 2 after the pulse width roughly dividing signal Vm has risen, the capacitor C is charged by the on pulses of the pulse width finely dividing signal Vs via the resistor R 11, and besides the capacitor C is also charged by the on pulses of the pulse width roughly dividing signal Vm via the resistor R 12, so that in the control signal Vd formed is a second varying segment 31 rising more steeply aslope than does the first varying segment 30. In this instance, resistive values of the resistors R 11, R12 and a capacitance of the capacitor C are set so that a time Td elapsing in the state 2 beginning with the rise of the pulse width roughly dividing signal and lasting until the voltage level of the control signal Vd reaches a threshold value Vd_th along the second varying segment 31 varies in increments of a time length shorter than the clock pulse duration $T_{clk}$ in association with variations in the on time $T_{on\_s}$ of the pulse width finely dividing signal Vs.

Meantime, the feedback circuit 21 of the present embodiment performs pulse-width varying control of the pulse drive signal Vg in order to stabilize the output voltage Vo under monitoring. Objectives under monitoring may, however, involve not only the output voltage Vo but also a current flowing through the free-wheeling diode 5 or the choke coil 6 as does a feedback circuit of a peak current control.

Next is a description of behavior of the above circuitry. When the pulse drive signal from the drive circuit 20 is supplied to the switching element 4, the switching element 4 performs a switching operation, so that the output voltage Vo lower than the input voltage Vi is generated across the smoothing capacitor 7. The voltage Vo is supplied to the load 10 connected with output terminals 8, 9.

On the other hand, a feedback circuit 21, as set forth above, monitors variations in the output voltage Vo to perform the on pulse width varying control of the pulse drive signal Vg output from the drive circuit 20 in order to stabilize the output voltage Vo. More specifically, a voltage level of a detected signal obtained by dividing the output voltage Vo through the dividing resistors R 12, 13 and the reference voltage of the reference supply 15 are compared by the comparator 16 to supply the compared signal output to the input terminal of the DSP 17. Receiving the signal output, the DSP 17 generates, from one side terminal, the on pulses of the pulse width finely dividing signal Vs whose on time $T_{on\_s}$ varies by a clock pulse duration $T_{clk}$, while the DSP 17 generates, from the other output terminal, the on pulses of the pulse width roughly dividing signal Vm with a certain on time $T_{on\_m}$ after the pulse width finely dividing signal Vs has risen.

Now then, when the on pulses of the pulse width finely dividing signal Vs have risen in the state 1 shown in FIG. 2, the time control circuit 18 initiates charging to the capacitor C via the resistor R 11. Then, as a voltage level of the on pulses of the pulse width finely dividing signal Vs is equal to the operating voltage Vcc, a voltage level of the control signal Vd forms the first varying segment 30 rising aslope as time t goes on. The voltage level of the control signal Vd is linearly approximated as represented by the following formula (2).

$$Vd \cong Vcc \cdot \frac{t}{R11 \cdot C} \qquad (2)$$

Accordingly, the longer the on time $T_{on\_s}$ of the pulse width finely dividing signal Vs becomes, the higher the voltage level Vd1 of the control signal Vd becomes at the time of the rising of the on pulses of the pulse width roughly dividing signal Vm, thus obtaining the formula (3) as follows.

$$Vd \cong Vcc \cdot \frac{(Ton\_s - Ton\_m)}{R11 \cdot C} \qquad (3)$$

When coming into the state 2 in which the on pulses of the pulse roughly dividing signal Vm start to rise, the capacitor C is charged not only via the resistor R 11 but also via the resistor R 12, whereby the voltage level of the control signal Vd, which is a voltage across the capacitor C makes the transition to the second varying segment 31 that rises more sharply aslope than does the previous first varying segment 30. At that time, linear approximation of the voltage level of the control signal Vd yields the following formula (4).

$$Vd \cong Vcc \cdot \frac{t}{(R11 // R12) \cdot C} + Vd1 \qquad (4)$$

where t denotes time elapsing after the transition to the state 2, while R11//R12 denotes a composite resistive value of R 11 and R 12 that are parallel-connected. The composite resistive value is expressed as the following formula (5).

$$R11 // R12 = \frac{R11 \cdot R12}{R11 + R12} \qquad (5)$$

Accordingly, when the voltage level of the second varying segment 31 of the control signal Vd reaches the threshold value Vd_th and thus the pulse drive signal Vg from the drive circuit 20 rises, the linear approximation formula of the forgoing formula (4) is expressed by the following one (6).

$$Vd\_th \cong Vcc \cdot \frac{Td}{(R11 // R12) \cdot C} + Vd1 \qquad (6)$$

where Td denotes the time elapsing in the state 2 beginning with the rise of the on pulses of the pulse width roughly dividing signals Vm and lasting until the voltage level of the control signal Vd reaches the threshold value Vd_th.

After the voltage level of the control signal Vd has reached the threshold value Vd_th, the capacitor C is further charged and the control signal Vd is kept at a higher voltage level than the threshold value Vd_th till the on-pulses of the pulse width finely dividing signal Vs and pulse width roughly dividing signal Vm fall simultaneously. Accordingly, the drive circuit 20 keeps supplying the pulse drive signals Vg of the on pulses to the switching element 4 to turn on the switching element 4 while the voltage level of the control signal Vd reaches the threshold value and then the on pulses of the pulse width finely dividing signal Vs and pulse width roughly dividing signal Vm fall simultaneously.

Thereafter, when the on-pulses of the pulse width finely dividing signal Vs and the pulse width roughly dividing signal Vm fall simultaneously, the switching element 4 is turned off. Subsequently, since there is provided a time during which both signals Vs and Vm are in an off state and charge that has been stored in the capacitor C is discharged rapidly through the diode D1 from the DSP 17, the voltage level of the control signal Vd returns to zero, standing ready for the next state 1, which is, the time period, during which the voltage level of the control signal Vd reaches the threshold value Vd_th and then the on-pulses of the pulse width finely dividing signal Vs and pulse width roughly dividing signal Vm fall, corresponds to an on time Tx of the pulse drive signal Vg and at the same time corresponds to an on time of the switching element 4.

To transform the formula 6, the time Td in the state 2 is expressed as the following formula 7.

$$Td \cong \frac{\{R11 // R12\} \cdot C \cdot\} \cdot (Vd\_th - Vd1)}{Vcc} \quad (7)$$

$$\cong \frac{(R11 // R12) \cdot C \cdot Vd\_th}{Vcc} - \frac{(R11 // R12) \cdot (Ton\_s - Ton\_m)}{R11}$$

According to the formula 7, if the threshold value Vd_th of the control signal Vd at which the on pulses of the pulse drive signal Vg rise, the operating voltage Vcc, the on time Ton_m of the pulse width roughly dividing signal Vm, the resistive values of the resistors R11, R12 and a capacitance of the capacitor C are assumed to be all constant, then a minimal time-varying width ΔTd in the state 2 at the time when the on time Ton_s of the pulse width finely dividing signal Vs varies by the clock pulse duration $T_{clk}$ (=ΔTon_smin) as a minimal unit, is expressed by the following formula 8.

$$\Delta Td \cong \frac{(R11 // R12) \cdot \Delta \text{Ton\_s min}}{R11} \quad (8)$$

In the formula 8 mentioned above, since the minimal time-varying width ΔTd in the state 2 corresponds to a minimal time-varying width of the on pulse of the pulse drive signal Vg, regulating the resistive values of the resistors R11, R12 in the configuration of the time control circuit 18 shown in FIG. 1 enables the minimal time-varying width of the on pulse of the pulse drive signal Vg to be set as an arbitrary value shorter than the clock pulse duration $T_{clk}$ contrary to the pulse width finely dividing signal Vs that varies discontinuously in time width with the clock pulse duration $T_{clk}$ defined as a minimal unit, so that a preset degree of precision in the output voltage Vo does not drop even if a switching frequency of the switching element increases. According to the formula 8, when the minimal time varying width ΔTd of the on pulse of the pulse drive signal Vg is desired to be small, the resistive value of the resistor R11 may be made large, while that of R12 may be made small. Alternatively, the minimal time width ΔTd can be also regulated by means of a so-called phase shift that varies a phase difference between the pulse width finely dividing signal Vs and the pulse width roughly dividing signal Vm with the on time Ton_s of the pulse width finely dividing signal Vs kept constant. Further, since Vd1, Vd vary proportionally to the Vcc value as shown in the formulae 3, 4, the operating voltage Vcc of the DSP 17 may be regulated by a well-known operating voltage varying means such as a PCM modulation, a D/A conversion, and an OP-amp or the like. Furthermore, the threshold value Vd_th may be made variable by providing a threshold value varying means in the drive circuit 20. Such an example is described later.

In order to carry out a sequence of the aforementioned behaviors, design conditions shown below are needed. First, with regard to functions of the DSP 17, the on time Ton_s of the pulse width finely dividing signal Vs is set longer than the on time Ton_m of the pulse width roughly dividing signal Vm no matter how the Ton_s varies, satisfying (Ton_s−Ton_m≧0). Otherwise, as is clear from the formula 3, the voltage level Vd1 of the control signal corresponding to the time in the state 1 is not generated.

With reference to the formula 8, the resistive values of the resistors R11, R12 that make up the time control circuit 18 should be determined so that the minimal time-varying width ΔTd in the state 2 is not more than the clock pulse duration $T_{clk}$ (=ΔTon_smin), which is the minimal varying unit time of the pulse width finely dividing signal Vs. Otherwise, time resolution of the on pulse of the pulse drive signal Vg becomes lower than those of the pulse width finely dividing signal Vs and pulse width roughly dividing signal Vm that are generated in the DSP 17, failing to attain the desired aim.

Further, the threshold value Vd_th of the control signal Vd at which the on pulse of the pulse drive signal Vg rises should exceed the voltage level Vd1 of the control signal Vd at the time the on pulse of the pulse width roughly dividing signal Vm rises. Hence, the following condition of the formula 9 needs to be met no matter how the on time Ton_s of the pulse width finely dividing signal Vs varies.

$$\frac{Vcc \cdot (\text{Ton\_s} - \text{Ton\_m})}{R11 \cdot C} < Vd\_th \quad (9)$$

In order to meet the above condition, the resistive value of the resistor R11 or the capacitance of the capacitor C that make up the first time-voltage converting circuit are set appropriately, so that the first varying segment 30 may be regulated so as to have a preferable gradient.

In the present embodiment, the on pulse of the pulse drive signal Vg from the drive circuit 20 turns on the switching element 4. If the control signal Vd enough to turn on the switching element 4 can be supplied to the switching element 4, then the drive circuit 20 may be omitted and instead the control signal Vd may be supplied directly to a control terminal (e.g., a gate of a MOSFET) of the switching element 4. In this case, the control signal Vd corresponds to the control pulse, while the threshold value Vd_th of the control signal Vd for turning on the switching element 4 depends not on the drive circuit 20 but on a characteristics of the switching element 4 itself. Alternatively, in the circuit shown in FIG. 1, a reference electric source 15 and a comparator 16 may be incorporated inside the DSP 17.

According to the present embodiment as described above, in the feedback circuit 21 corresponding to the pulse generator for generating the pulse drive signal Vg serving as a control pulse whose time width Tx as a pulse width varies in response to the output voltage Vo or the like under monitoring, there are provided the DSP 17 serving as a variable signal output means for outputting the pulse width dividing signals (the pulse width finely dividing signal Vs and the pulse width roughly dividing signal Vm) whose time width Ton_s varies by the clock pulse duration Tlk as the unit time in response to the variations in an objective under monitoring and the time control circuit 18 serving as a time control means for detecting variations in the time width Ton_s of the pulse width dividing signal, specifically of the pulse width finely dividing signal Vs to allow the time width Tx of the pulse drive signal Vg to vary in increments of a time length shorter than the clock pulse duration $T_{clk}$ as the unit time. In other words, the time control circuit 18 is provided with a function for generating, in the control signal Vd, the varying segments 30, 31 for allowing the time width Tx of the pulse drive signal Vg to vary by the shorter time ΔTd than the clock pulse duration $T_{clk}$ by the pulse width finely dividing signal Vs and the pulse width roughly dividing signal Vm.

In this instance, the time width Ton_s of the pulse width finely dividing signal Vs from the DSP 17 decreases or increases by the clock pulse duration $T_{clk}$. Nevertheless, the time control circuit 18 that has received the pulse width finely dividing signal Vs can allow the time width Tx of the pulse drive signal Vg to vary in increments of a time length shorter than the clock pulse duration $T_{clk}$, so that the resolution of the time width Tx of the pulse drive signal Vg is improved so as to be higher than that of the clock pulse duration $T_{clk}$ serving as the time resolution of the DSP 17, eventually as that of the feedback circuit 21 itself. Consequently, without shortening purposely the clock pulse duration $T_{clk}$ serving as the unit time of the DSP 17, only addition of the time control circuit 18 realizes such a pulse control that pulse duration varies in increments of a time length shorter than the clock pulse duration $T_{clk}$.

In the present embodiment, the pulse width dividing signal output from the DSP 17 comprises the pulse width roughly dividing signal Vm with the time width Ton_m, which is approximately equal to the time width Tx of the pulse drive signal Vg and the pulse width finely dividing signal Vs with the time width Ton_s for regulating the time width Tx of the pulse drive signal Vg by the unit time, while the time control circuit 18 approximately determines the time width Tx of the pulse drive signal Vg by the pulse width roughly dividing signal Vm and further regulates the time width Tx of the pulse drive signal Vg in increments of a time length shorter than the unit time by means of the pulse width finely dividing signal Vs.

Consequently, the time control circuit 18 generates approximately the time width Tx of the pulse drive signal Vg by the pulse width roughly dividing signal Vm generated from the DSP 17, so that the time control circuit 18 can regulate delicately the time width Tx of the pulse drive signal Vg by the pulse width finely dividing signal Vs obtained from the same DSP 17. Accordingly, the time control circuit 18 can allow the time width Tx of the pulse drive signal Vg to vary in increments of a time length shorter than the clock pulse duration $T_{clk}$ by the couple of the pulse width dividing signals Vm, Vs generated from the DSP 17.

In the present embodiment, the circuitry of the DSP 17 is made up so as to output the pulse width finely dividing signal Vs ahead of the pulse width roughly dividing signal Vm, while the time control circuit 18 regulates the time width Tx of the pulse drive signal Vg in increments of a time length shorter than the clock pulse duration $T_{clk}$ after the pulse width roughly dividing signal Vm have been output.

In this case, since the time width Tx of the pulse drive signal Vg is delicately regulated after the output of the pulse width roughly dividing signal Vm following the output of the pulse width finely dividing signal Vs, the time width Tx of the pulse drive signal Vg is defined only after the outputs of the pulse width finely dividing signal Vs and the pulse width roughly dividing signal Vm. Therefore, the time width Tx of the pulse drive signal Vg can be prevented from lengthening uselessly.

Besides, in the present embodiment, there is provided the DSP 17 serving as a reference signal generator for generating the pulse width roughly dividing signal Vm with the constant on time Ton_m that rises behind the pulse width finely dividing signal Vs and falls at same timing as does the pulse width finely dividing signal Vs. Further, the time control circuit 18 is provided with the resistor R11 and the capacitor C that serve as the first time-voltage converting circuit for raising the voltage level of the control signal Vd proportionally to the on time Ton_s of the pulse width finely dividing signal Vs and further is provided with the resistor R12 and the capacitor C that serve as the second time-voltage converting circuit for raising the voltage level of the control signal Vd proportionally to the on time Ton_m of the pulse width roughly dividing signal Vm.

Thus, in the state 1 in which only the on pulse of the pulse width finely dividing signal Vs is being generated, when the control signal Vd rises to the voltage level Vd1 by means of the resistor R11 and capacitor C and thereafter the on pulse of the pulse width roughly dividing signal Vm begins to be generated, the voltage level of the control signal Vd rises, by means of the resistor R12 and capacitor C, to the threshold value Vd_th enough to generate the pulse drive signal Vg. The voltage level Vd1 of the control signal Vd at the time when the pulse width roughly dividing signal Vm rises can vary in response to variations in the on time Ton_s of the pulse width finely dividing signal Vs. Hence, timing of the rise of the on pulse of the pulse drive signal Vg can vary in increments of a shorter time ΔTd than the clock pulse duration $T_{clk}$. Besides, since the timing of when the pulse drive signal Vg is turned on in this instance is inevitably later than the rising of the on pulse of the pulse width roughly dividing signal Vm, the on pulse width of the pulse drive signal Vg can be effectively regulated by means of the pulse width roughly dividing signal Vm.

Further, in the present embodiment, the pulse width finely dividing signal Vs and the pulse width roughly dividing signal Vm are generated in the common DSP 17 serving as the pulse generator. As a result, the circuitry thereof can be simplified, so that reduction in the inside size of the apparatus can be achieved.

Furthermore, in the present embodiment, the first time-voltage converting circuit comprises the resistor R11 and the capacitor C, while the second time-voltage converting circuit comprises another resistor R12 and the capacitor C, which is common to the first and second time-voltage converting circuits.

Thus, simply regulating the resistive values of the resistors R11, R12, enables the time ΔTd serving as the time resolution of the on pulse of the pulse drive signals Vg to be easily set variable. Further, the capacitor C can be used in common that serves as a charge and discharge element for the first and second time—voltage converting circuits, so that simplification of the circuitry can be again achieved.

Moreover, in the present embodiment, there is provided the drive circuit 20 serving as the pulse generating means for generating the pulse drive signal Vg, which is the control pulse when the input voltage exceeds the predetermined threshold value. The circuitry of the time control circuit 18 functions to generate the pulse generating signal (the control signal Vd) for raising a voltage level depending on the pulse width finely dividing signal at different predetermined gradient with the pulse generating signal superposed on the voltage level when the pulse width roughly dividing signal Vm, for example, rises to initiate its output. By turning the control signal Vd into the input voltage to the drive circuit 20, the pulse width of the pulse drive signal Vg is regulated in increments of a time length shorter than the unit time.

Thus, the pulse width as the on time width Tx of the pulse drive signal Vg is determined by both the control signal Vd generated from the DSP 17 serving as a variable signal output means via the time control circuit 18 and the threshold value Vd_th set in the drive circuit 20. The longer the time from an output start of the pulse width finely dividing signal Vs until the subsequent output start of the pulse width roughly dividing signal Vm becomes, the shorter the delay time required for the pulse width roughly dividing signal Vm to reach the threshold value Vd_th after the output start thereof becomes, so that start timing of the generation of the pulse drive signal Vg gets earlier. Hence, the pulse width of the pulse drive signal Vg can be delicately regulated by varying output start timing of the pulse width finely dividing signal Vs. Consequently, the pulse width of the pulse drive signal Vg can vary in increments of a time length shorter than the unit time by both the couple of the pulse width dividing signals Vm, Vs and the threshold value Vd_th set in the drive circuit 20.

Still further, as seen from a different aspect of the present embodiment, in the pulse generator for generating the pulse drive signal Vg serving as the control pulse that varies in pulse width in response to the output voltage Vo under monitoring, there is provided the DSP 17 serving as the variable signal output means for outputting the pulse width roughly dividing signal Vm with the time width, which is approximately equal to the pulse width of the pulse drive signal Vg and the pulse width finely dividing signal Vs whose phase difference from the pulse width roughly dividing signal Vm varies by the unit time (a clock pulse duration $T_{clk}$) in response to the output voltage Vo, and further there is provided the time control circuit 18 for detecting variations in the phase difference to allow the pulse width of the pulse drive signal Vg to be varied in increments of a time length shorter than the unit time.

In this case, the pulse width finely dividing signal Vs from the DSP 17 varies in phase difference from the pulse width roughly dividing signal Vm every unit time. The time control circuit 18, however, in response to the phase difference, can vary the pulse width as the time width of the pulse drive signal Vg in increments of a time length shorter than the unit time. Hence, the resolution of the pulse width of the pulse drive signal Vg is improved so as to be higher than that of the clock pulse duration $T_{clk}$ that is the time resolution of the pulse generator itself. Accordingly, without taking the trouble to shorten the clock pulse duration $T_{clk}$ as the unit time of the pulse generator, and by just adding the time control circuit 18, it is possible to control pulse width in increments of a time length shorter than the unit time by means of the couple of the pulse width dividing signals Vm, Vs generated in the DSP 17.

Embodiment 2

Figure 3:
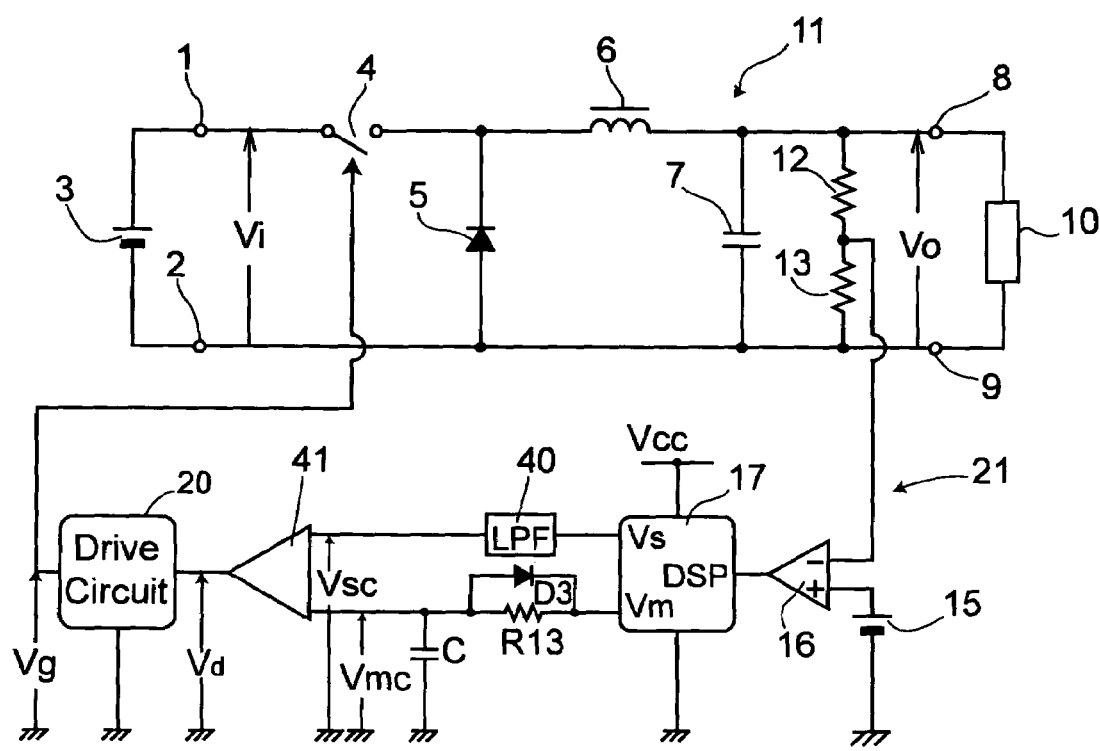
FIG. 3 is a schematic circuit diagram illustrating one example of a switching regulator of the second embodiment in the present invention.

FIG. 3 shows a second embodiment of the pulse generator according to the present invention. The configuration is the same as that of the first embodiment shown in FIG. 1 except a DSP 17 of a feedback circuit 21 corresponding to a pulse generator and a time control circuit 18. The time control circuit 18 in the present embodiment is configured as follows: a low pass filter (hereinafter, acronymized as LPF) 40 is connected between one terminal of the DSP 17 where the pulse width finely dividing signal Vs is generated and an input terminal of a drive circuit 20; a parallel circuit of a resistor R13 and diode D3, which is connected to the resistor 13 with reverse polarity and is used for discharge of a capacitor C, is connected between the other terminal of the DSP 17 where a pulse width roughly dividing signal Vm is generated and the input terminal of the drive circuit 20; the capacitor C is connected to one end of the parallel circuit. The time control circuit 18 functions to generate a control signal Vd by adding up a conversion voltage Vsc of the pulse width finely dividing signal Vs and a conversion voltage Vmc of the pulse width roughly dividing signal Vm by using an adder 41.

The LPF 40 is provided for the purpose of smoothing an on pulse of the pulse width finely dividing signal Vs to generate a constant level bias voltage. Instead of the LPF, there may be provided, e. g., a PCM modulator for converting a pulse-coded pulse width finely dividing signal Vs from the DSP 17 into a bias voltage, a D/A converter for converting a digitized pulse width finely dividing signal Vs from the DSP 17 into the bias voltage, or a widely known voltage generating means such as an OP-amp or the like for amplifying the pulse width finely dividing signal Vs from the DSP 17 to convert the signal into the bias voltage. When these devices are used, various forms of the pulse width finely dividing signal Vs output from the DSP 17 can be easily turned into a desired bias voltage.

A series circuit of the LPF 40 and the adder 41 corresponds to a first time-voltage converting circuit for raising a voltage level of the control signal Vd in response to the conversion voltage Vsc obtained by smoothing the pulse width finely dividing signal Vs having an on time Ton_s. A series circuit of the resistor R13 and the capacitor C corresponds to a second time-voltage converting circuit for raising the voltage level of the control signal Vd proportionally to an on time Ton_m of the pulse width roughly dividing signal Vm. In this case, as shown in FIG. 4, a filter constant of the LPF 40, a resistive value of the resistor R13 and a capacitance of the capacitor C are set so that a time Td, in a state 2 from when the pulse width roughly dividing signal Vm starts to rise till when the voltage level of the control signal Vd reaches a threshold value Vd_th through a varying segment 31, varies in increments of a time length shorter than the clock pulse duration $T_{clk}$ according to variations in the conversion voltage Vsc obtained by smoothing the pulse width finely dividing signal Vs.

Next is a description of behavior of the configuration described above. When a pulse drive signal from the drive circuit 20 is supplied to a switching element 4, the switching element 4 performs switching operation to generate an output voltage Vo lower than an input voltage Vi across the smoothing capacitor 7. The output voltage Vo is supplied to a load 10 connected across terminals 8, 9.

On the other hand, the feedback circuit 21, as above-described, monitors variations in the output voltage Vo to perform a variable control of an on pulse width of the pulse drive signal Vg from the drive circuit 20 so as to stabilize the output voltage Vo. More specifically, a comparator 16 compares a voltage level of a detected signal obtained by dividing the output voltage Vo by means of the voltage dividing resistors R12, R13 and a reference voltage of a reference electric source 15 to supply the compared signal to an input terminal of the DSP 17. Receiving the signal output, the DSP 17 then generates a group of on pulses of the pulse width finely dividing signal Vs from one output terminal thereof. The group of the on pulses of the pulse width finely dividing signal Vs has a constant on time Ton_s (a duty ratio) with the clock pulse duration $T_{clk}$ defined as a unit time and of a predetermined frequency, which is variable in response to the signal output compared as mentioned above. The on pulse of the pulse width roughly dividing signal Vm with a constant on time Ton_m is generated from the other output terminal of the DSP 17 after the rise of the group of the on pulses of the pulse width finely dividing signal Vs.

Figure 4:
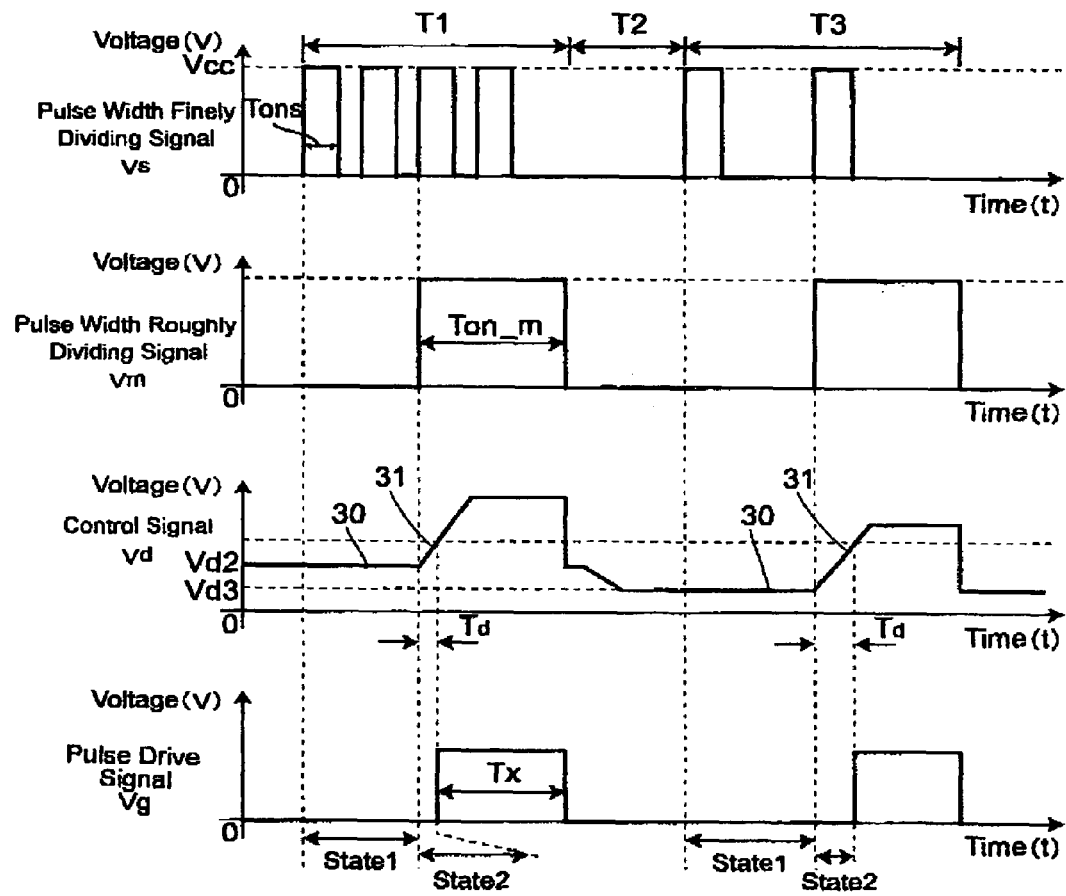
FIG. 4 is a group of waveform charts of each section of the same.

In the time control circuit 18, in a sate 1 of a zone T1 shown in FIG. 4, when the group of the on pulses of the pulse width finely dividing signal Vs is generated, the group of the on pulses of the pulse width finely dividing signal Vs is smoothed by the LPF 40 to be input into the adder 41 as the conversion voltage Vsc. At this time, since the pulse width roughly dividing signal Vm, and eventually the conversion voltage Vmc is not yet generated, a first varying segment 30 that keeps a constant voltage Vd2 is formed after the control signal Vd has risen aslope from zero as a result of an operation of the adder 41.

When coming into a state 2 in which the on pulse of the pulse width roughly dividing signal Vm rises, the capacitor C is charged through the resistor R13, so that a voltage across the capacitor C is input into the adder 41 as the conversion voltage Vmc. At this time, a voltage level of the control signal Vd obtained in the adder 41 results in the sum (superposed value) of the conversion voltage Vsc and conversion voltage Vmc. Consequently, the voltage level of the control signal Vd is biased by a voltage level Vd2 of the first varying segment 30, which causes the transition to the second segment 31 that rises aslope.

After the voltage level of the control signal Vd has reached the threshold value Vd_th, the capacitor C is furthermore charged, so that the control signal Vd is kept at a higher voltage level than the threshold value Vd_th until the on pulse of the pulse width roughly dividing signal Vm begins to fall. Accordingly, while the voltage level of the control signal Vd reaches the threshold value Vd_th and then the on pulse of the pulse width roughly dividing signal Vm begins to fall, the drive circuit 20 continues to supply the pulse drive signal Vg, which is the on pulse to the switching element 4, so that the switching element 4 stays on.

Thereafter, when the on pulse of the pulse width roughly dividing signal Vm falls, the switching element 4 is turned off. Afterward, a zone T2 is provided as a time in which the pulse width roughly dividing signal Vm is turned off. Therefore, since the charge stored in the capacitor C is discharged rapidly from the DSP 17 via the diode D3, the voltage level of the control signal Vd becomes, e.g., Vd3 lower than Vd2 to make the next state 1 (a zone T3) standby. In other words, a time period during which the voltage level of the control signal Vd reaches the threshold value Vd_th and then the on pulse of the pulse width roughly dividing signal Vm falls corresponds to the on time Tx of the pulse drive signal Vg and at the same time to the on time of the switching element 4.

The group of the on pulses of the pulse width finely dividing signal Vs is generated at lower frequency in the zone T3 than in the zone T1. Accordingly, since the conversion voltage Vsc smoothed by the LPF 40 gets low, a minimal time-varying width ΔTd required for the voltage level of the control signal Vd to reach the threshold value Vd_th lengthens according as the voltage level of the first varying segment 30 becomes, e.g., Vd3 lower than Vd2. In other words, the minimal time-varying width ΔTd varies in response to the voltage level at the time when the on pulse of the pulse width roughly dividing signal Vm rises and eventually to a frequency of the pulse width finely dividing signal Vs.

In a circuitry of the time control circuit 18 as shown in FIG. 3, by regulating the resistive value of the resistor 13, a minimal time-varying width of the on pulse of the pulse drive signal Vg can be set at an arbitrary shorter value than the clock pulse duration $T_{clk}$ in contradiction to the pulse width finely dividing signal Vs whose frequency varies discontinuously with the clock pulse duration $T_{clk}$ defined as a minimal time unit. Therefore, even if a switching frequency of the switching element 4 increases, a preset degree of accuracy in the output voltage Vo does not drop. When the minimal time-varying width ΔTd of the on pulse of the pulse drive signal Vg is desired to be reduced, the resistive value of the resistor R13 may be decreased.

Incidentally, the following design requirement is needed for carrying out a sequence of the behavior described above. First, with regard to a configuration of the DSP 17, the on time Ton_s of the pulse width finely dividing signal Vs and its frequencies may be made variable in any wise within the same zone or the like, e.g., the zone T1. It is necessary, however, that the voltage level of the conversion voltage Vsc smoothed by the LPF 40 should be determined lower than the threshold value Vd_th so as to satisfy Vd_th−Vsc>0. Otherwise, at a stage of the state 1, the on pulse of the pulse width roughly dividing signal Vm cannot be prevented from rising. Further, it is desirable that the pulse width finely dividing signal Vs is generated so as to keep the varying segment 30 at a constant voltage since the minimal time-varying width ΔTd of the on pulse of the pulse drive signal Vg is determined uniquely.

Figure 5:
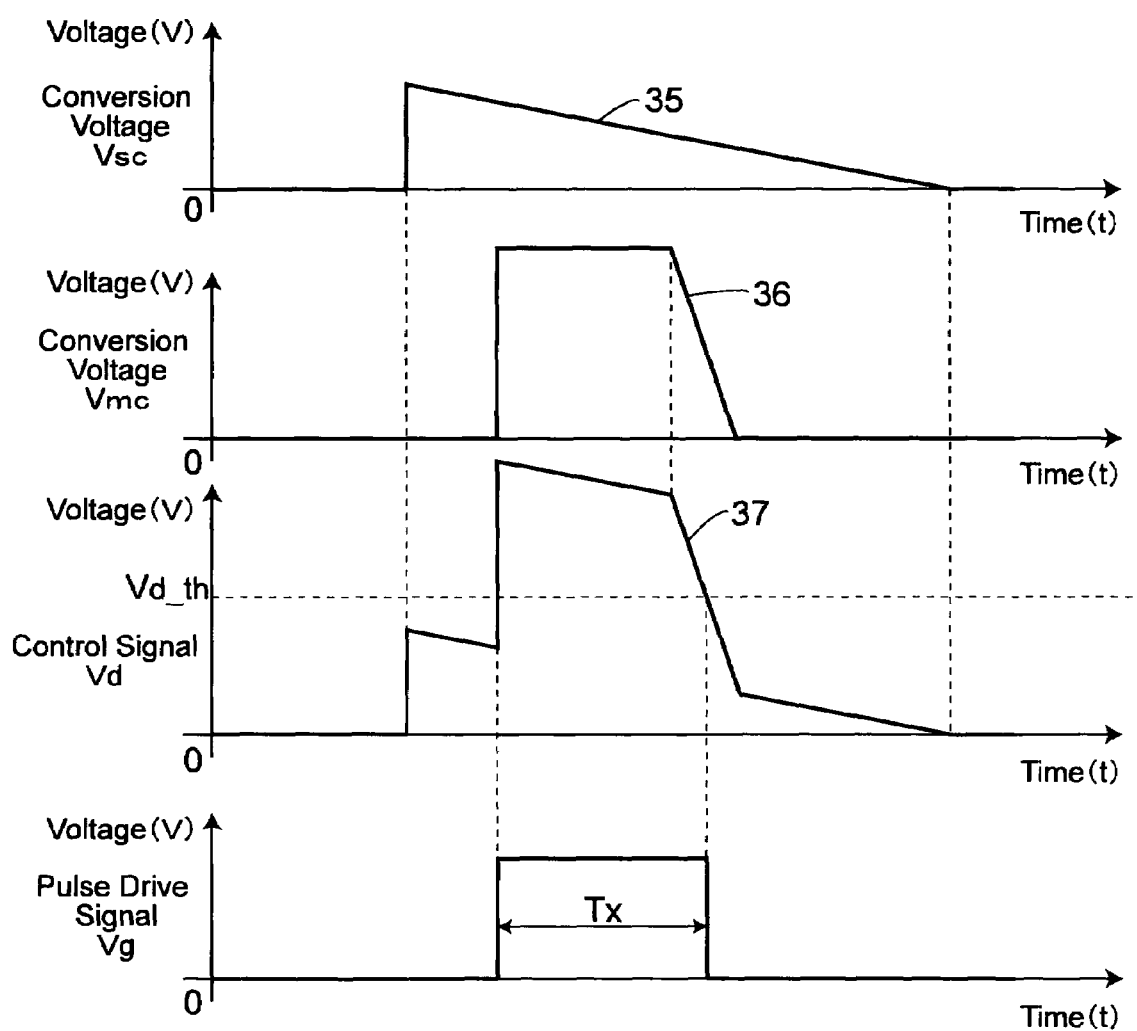
FIG. 5 is a group of waveform charts of each section showing one modification.

As a modified example of the present embodiment, there is provided a circuitry in which the conversion voltages Vsc, Vmc with waveforms shown in FIG. 5 are input to the adder 41. In this circuitry, a falling edge of the pulse drive signal Vg is delayed, so that the voltage levels of the conversion voltages Vsc, Vmc reach each of peak values at their rising and thereafter fall at a gradient determined by the time control circuit 18. In this instance, at the same time as the rising of the conversion voltage Vmc, the voltage level of the control signal Vd exceeds the threshold value Vd_th and then the pulse drive signal rises and thereafter when a downward slope segment 37 of the control signal Vd has fallen to the threshold value Vd_th, the pulse drive signal Vg begins to fall. The closer the timing that the conversion voltage Vsc that varies by the clock pulse duration $T_{clk}$ comes to the timing that the conversion voltage Vmc rises, the higher the peak value of the control signal Vd at the time when the pulse drive signal Vg rises becomes. However, the higher the peak value of the control signal Vd, the longer the time required for the voltage level of the control signal Vd to fall to the threshold value Vd_th, so that the on time Tx of the pulse drive signal Vg widens. Besides, here, through the time control circuit 18, the minimal time-varying width of the on time Tx of the pulse drive signal Vg can be set at an arbitrary shorter value than the clock pulse duration $T_{clk}$ by regulating accordingly a degree of the gradient of the downward slope segment 37 of the control signal Vd obtained by adding the downward sloping segments 35, 36 of the conversion signals Vsc, Vm.

In the present embodiment as described above, there are provided the drive circuit 20 serving as the pulse generating means for generating the pulse drive signal Vg, which is the control pulse when the input voltage exceeds the threshold value Vd_th. When the pulse width roughly dividing signal Vm, e.g., rises to initiate its output, the time control circuit 18 generates the pulse generating signal (the control signal Vd) for raising the voltage level depending on the pulse width finely dividing signal Vs at a different predetermined gradient with the pulse generating signal superposed on the voltage level. By making this control signal Vd into the input voltage to the drive circuit 20, the pulse width of the pulse drive signal Vg is regulated in increments of a time length shorter than the unit time. This time control circuit 18 is equipped with the LPF 40 serving as a bias voltage generating means for generating the voltage level depending on the pulse width finely dividing signal Vs at the time when the pulse width roughly dividing signal Vm begins to be output.

Thus, the LPF 40 serving as the bias voltage generating means, specifically, can supply the voltage level (so to say, corresponding to a segment) depending on the pulse width finely dividing signal Vs to the control signal Vd, which is the pulse generating signal. Hence, even if the DSP 17 outputs the pulse width finely dividing signal Vs comprising the group of the on pulses each of which is different in on time or in period by the unit time in response to an output voltage Vo under monitoring, the pulse width of the pulse drive signal Vg can be delicately regulated.

Further, in the present embodiment as shown in FIG. 5, there is provided the drive circuit 20 serving as the pulse generating means for generating the pulse drive signal Vg, which is the control pulse when the input voltage exceeds the predetermined threshold value Vd_th. When the pulse width roughly dividing signal Vm begins to be output, the time control circuit 18 generates the control signal Vd serving as the pulse generating signal for making the voltage level depending on the pulse width finely dividing signal Vs fall at a different predetermined gradient from the peak value exceeding the threshold value Vd_th with the control signal Vd superposed on the voltage level. By making the control signal Vd into the input voltage to the drive circuit 20, the pulse width of the pulse drive signal Vg is regulated in increments of a time length shorter than the unit time.

Thus, the pulse width, which is the on time width Tx of the pulse drive signal Vg is determined by both the control signal Vd generated from the DSP 17 serving as a variable signal output means via the time control circuit 18 and the threshold value Vd_th set in the drive circuit 20. The longer the time required from an output initiation of the pulse width finely dividing signal Vs to the subsequent output initiation of the pulse width roughly dividing signal Vm, the higher the peak value of the control signal Vd at the time of the output initiation of the pulse width roughly dividing signal Vm, so that a time required for the control signal Vd to fall to the threshold value Vd_th gets longer. In other words, by varying timing of the output initiation of the pulse width finely dividing signal Vs, finish timing of the generation of the pulse drive signal Vg is made variable, so that the pulse width of the pulse drive signal Vg can be delicately regulated. Accordingly, the pulse width of the pulse drive signal Vg can vary in increments of a time length shorter than the unit time by both the couple of the pulse width dividing signals Vm, Vs generated from the DSP 17 and the threshold value Vd_th set in the drive circuit 20.

Third Embodiment

Figure 6:
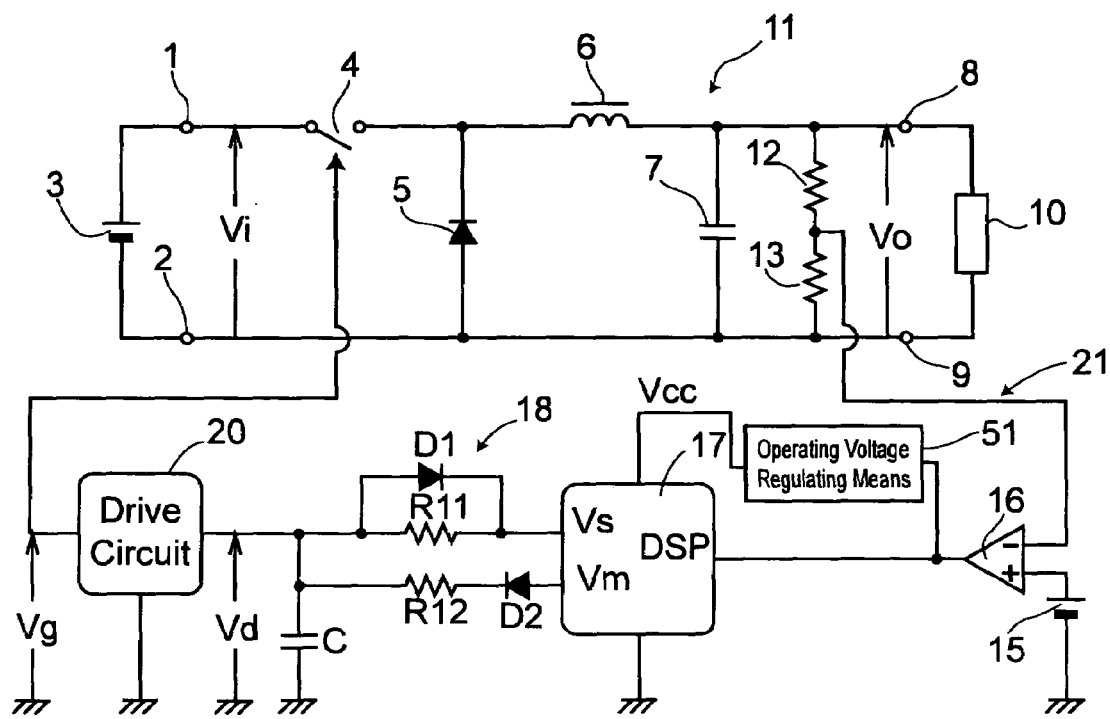
FIG. 6 is a schematic circuit diagram illustrating one example of a switching regulator of the third embodiment in the present invention.
Figure 7:
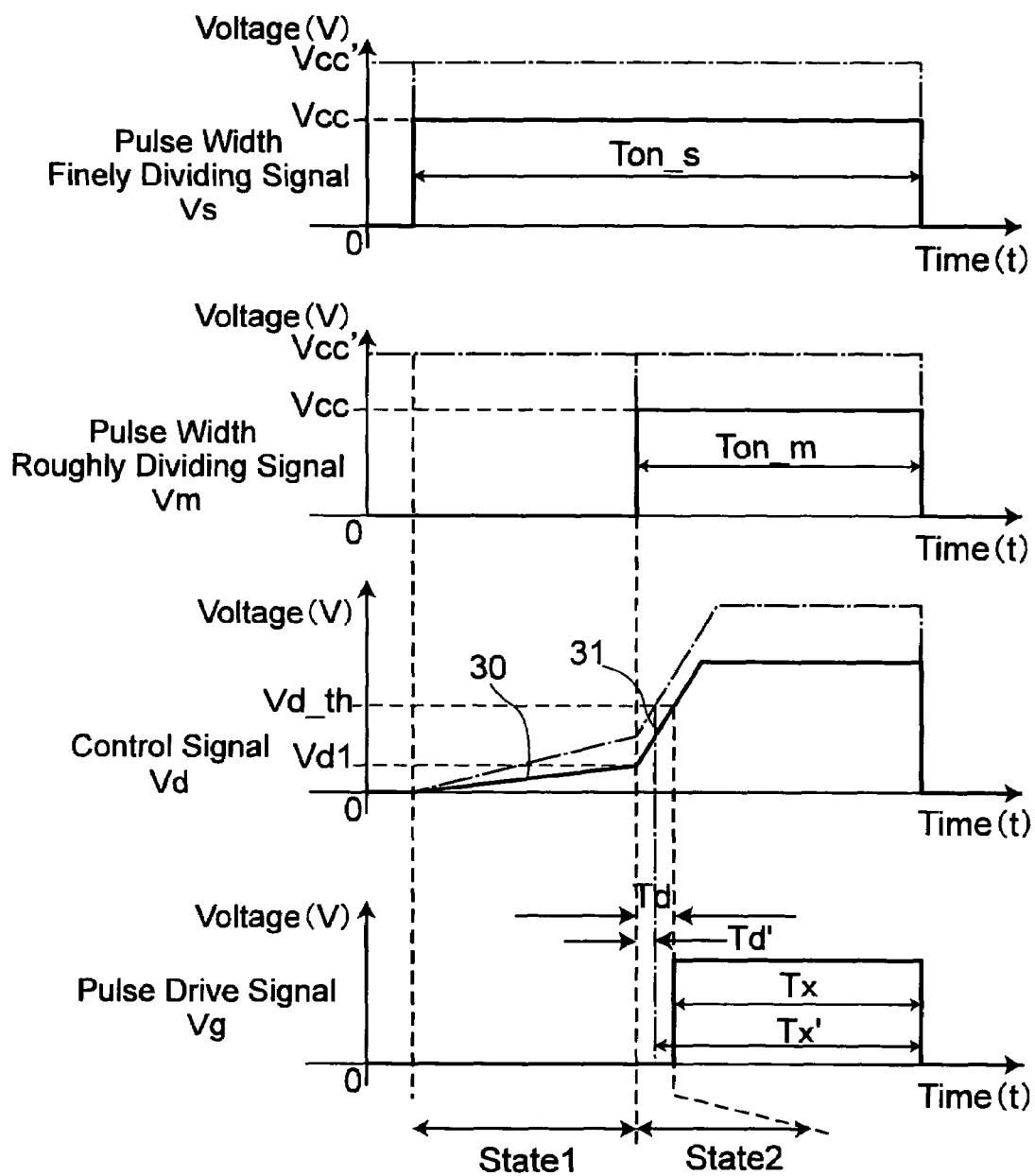
FIG. 7 is a group of waveform charts of each section of the same.

FIGS. 6, 7 show the third embodiment of the present invention. In a configuration of a switching regulator in FIG. 6, a signal output obtained by a comparator 16 is supplied not only to a DSP 17 but also to an operating voltage regulating means 51, which regulates a voltage level of an operating voltage Vcc supplied to the DSP 17 in response to a voltage level of an output voltage Vo under monitoring. The DSP 17 outputs a couple of pulse width dividing signals (a pulse width roughly dividing signal Vm, a pulse width finely dividing signal Vs) to a time control circuit 18 similarly as is done in each of the embodiments described above. Here in this embodiment, an on time Ton_s of the pulse width finely dividing signal Vs, however, is constant independently of the voltage level of the output voltage Vo. By providing the operating voltage regulating means 51, the voltage levels in the on time Ton_m of the pulse width roughly dividing signal Vm and in the on time Ton_s of the pulse width finely dividing signal Vs vary in response to the voltage level of the output voltage Vo. Hence, a voltage level of a control voltage Vd generated in the time control circuit 18 based on the pulse width roughly dividing signal Vm and the pulse width finely dividing signal Vs also rises aslope with a varying operating voltage Vcc defined as an upper limit. Except these configurations, the present embodiment has configuration in common with the first embodiment.

Meantime, in this embodiment, as time goes on, the voltage level of the control signal Vd rises aslope to reach finally the operation voltage Vcc. It is no problem, however, for the voltage level of the control signal Vd, as shown in FIG. 5, to reach the upper limit at the same time as rising initiation of the pulse width roughly dividing signal Vm and thereafter fall aslope as time goes on.

Next is a description of behavior of the configuration described above with reference to waveform diagrams of each section in FIG. 7. The operating voltage regulating means 51 regulates variably the operating voltage Vcc supplied to the DSP 17 in response to the voltage level of the output voltage Vo. When the output voltage Vo drops, for example, the operating voltage from the operating voltage regulating means 51 rises and then the voltage levels of the pulse width roughly dividing signal Vm and pulse width finely dividing signal Vs also rise at on states thereof (see the operating voltage Vcc' shown in FIG. 7). Thus, in the control signal Vd generated in the time control circuit 18, a first varying segment 30 and a second varying segment 31 also vary with the raised operating voltage Vcc defined as an upper limit. After the pulse width roughly dividing signal Vm has risen, a time Td required for the voltage level of the control signal Vd to reach the threshold value Vd_th shortens and therefore the on time Tx of the pulse drive signal Vg increases, so that a feedback circuit 21 operates so as to raise the output voltage Vo.

In the present embodiment as abovementioned, in the feedback circuit 21 serving as a pulse generator for generating the pulse drive signal Vg whose pulse width varies in response to on the out put voltage Vo, there are provided the drive circuit 20 serving as a pulse generating means for generating the pulse drive signal Vg when an input voltage exceeds a predetermined threshold value Vd_th, the operating voltage regulating means 51 for regulating the operating voltage Vcc in response to the output voltage, and the time control circuit 18 for generating the control signal Vd serving as a pulse generating signal for making the voltage level slope with the operating voltage Vcc defined as the upper limit to regulate the pulse width of the pulse drive signal Vg by turning the control signal Vd into the input voltage.

In this instance, the control signal Vd supplied from the time control circuit 18 to the dive circuit 20 rises aslope or falls aslope in voltage level with the operating voltage Vcc defined as the upper limit. Since the operating voltage Vcc, however, varies in response to the output voltage Vo, even if the control signal Vd is obtained based on the pulse width dividing signals Vm, Vs that vary by the unit time (the clock pulse duration $T_{clk}$), the pulse-width control for varying pulse duration in increments of a time length shorter than the unit time is possible independently of the unit time.

Fourth Embodiment

Figure 8:
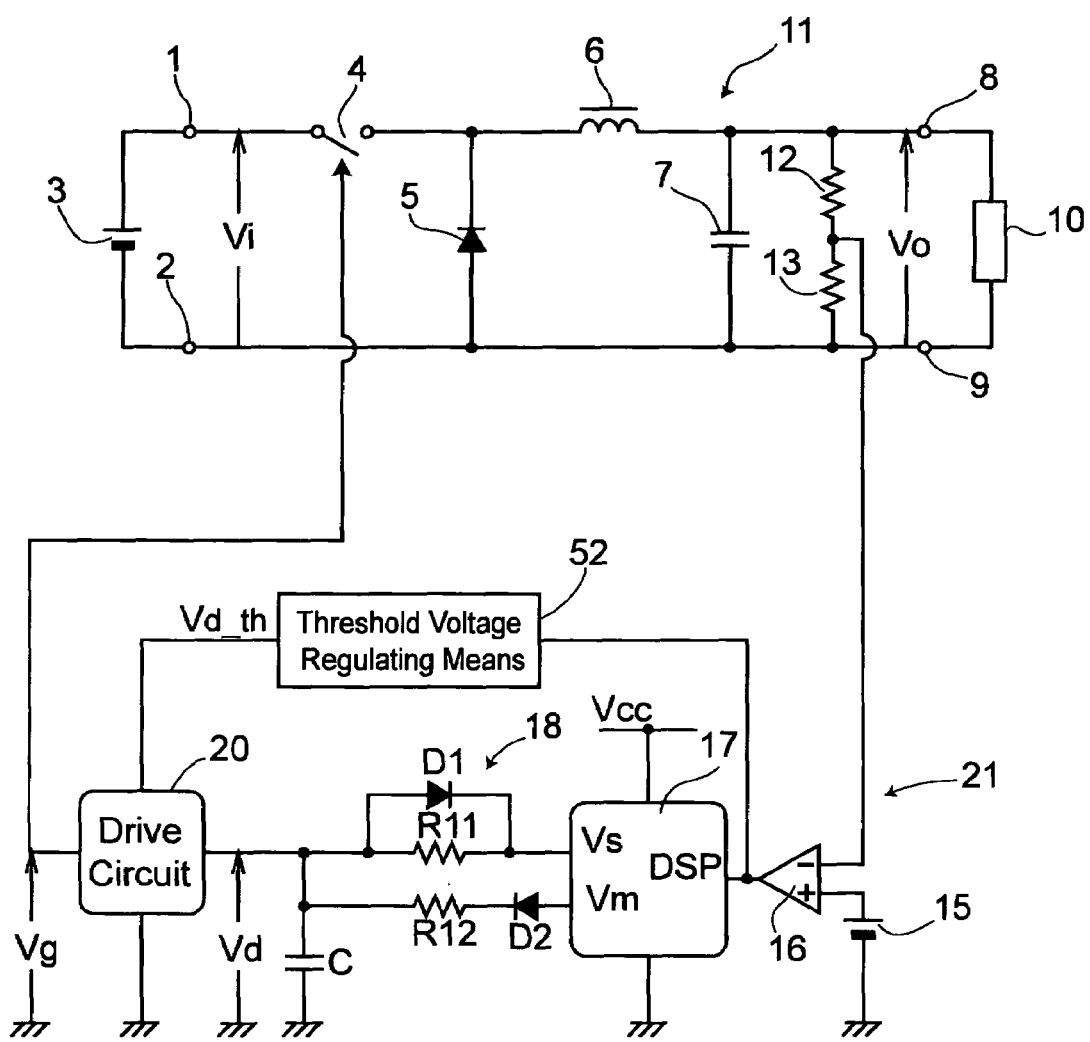
FIG. 8 is a schematic circuit diagram illustrating one example of a switching regulator of the fourth embodiment in the present invention.
Figure 9:
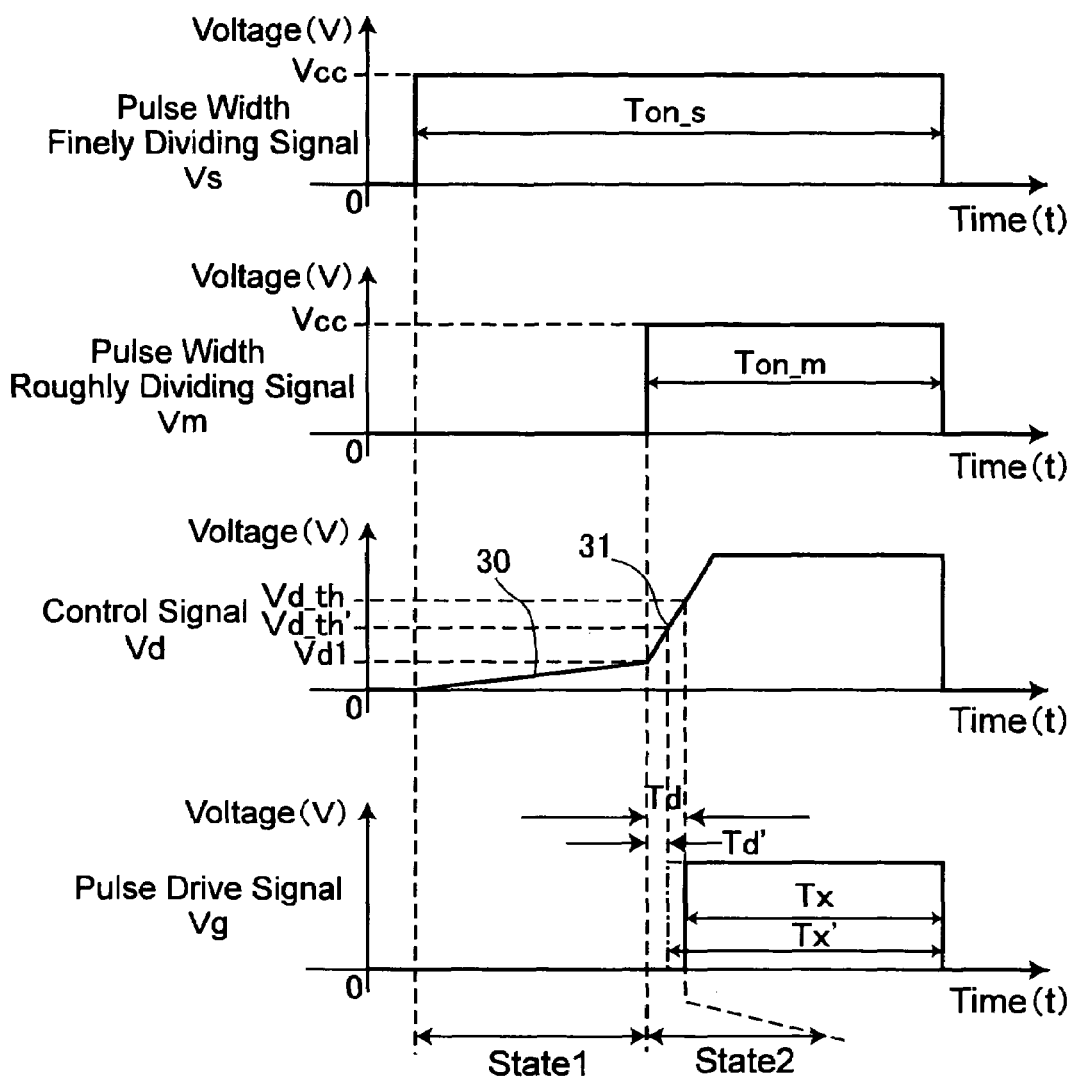
FIG. 9 is a group of waveform charts of each section of the same.
Figure 10:
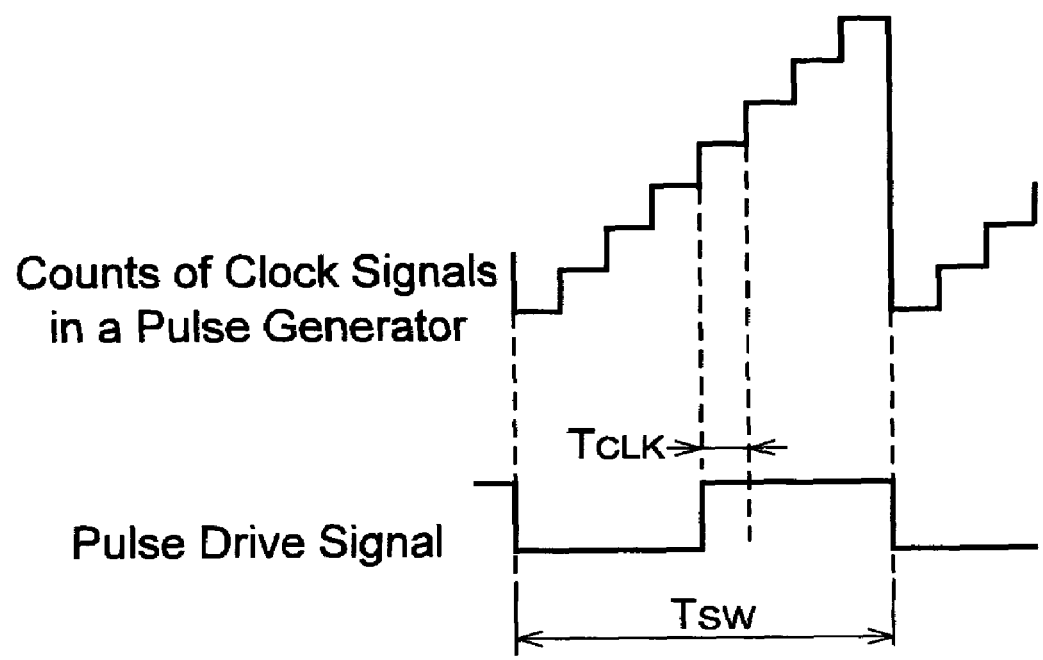
FIG. 10 is a group of waveform charts illustrating a relationship between counter values and pulse drive signals of the pulse generator in a conventional system.

FIGS. 8, 9 show the fourth embodiment of the present invention. In a switching regulator shown in FIG. 8, a signal output obtained by a comparison of a comparator 16 is supplied not only to a DSP 17 but also to a threshold voltage regulating means 52, which regulates a voltage level of a threshold value Vd_th in a drive circuit 20 in response to a voltage level of an output voltage Vo under monitoring. The DSP 17 outputs a couple of pulse width dividing signals (a pulse width roughly dividing signal Vm, a pulse width finely dividing signal Vs) to a time control circuit 18 in the same way as is done in the first embodiment. An on time Ton_s of the pulse width finely dividing signal Vs, however, is constant independently of the voltage level of the output voltage Vo. By providing the threshold voltage regulating means 52, the voltage level of the threshold value Vd_th in the drive circuit 20 varies in response to the voltage level of the output voltage Vo. Hence, even if a control signal Vd generated in the time control circuit 18 based on the pulse width roughly dividing signal Vm and the pulse width finely dividing signal Vs is constant, an on time Tx of a pulse drive signal Vg varies by the varying threshold value Vd_th. Except these configurations, the present embodiment has configuration in common with the first embodiment.

In addition, in the present embodiment, the voltage level of the control signal Vd rises aslope to finally reach the operating voltage Vcc as time goes on. As shown in FIG. 5, however, it is possible with no problem for the voltage level of the control signal Vd to reach an upper limit at the same time as rising of the pulse width roughly dividing signal Vm and thereafter fall aslope as time goes on.

Next is a description of behavior of the configuration described above with reference to waveform diagrams of each section in FIG. 9. The threshold voltage regulating means 52 regulates variably the voltage level of the threshold value Vd_th in a drive circuit 20 in response to the voltage level of the output voltage Vo. If the output voltage Vo drops, for example, the voltage level of the threshold value Vd_th in the drive circuit 20 drops (see the threshold value Vd_th shown in FIG. 9). Thus, even if the same control signal Vd is generated in the time control circuit 18, after the pulse width roughly dividing signal Vm has risen, a time Td required for the voltage level of the control signal Vd to reach the threshold value Vd_th shortens due to lowering of the voltage level of the threshold value Vd_th. Hence, the on time Tx of the pulse drive signal Vg increases, so that a feedback circuit 21 operates so as to raise the output voltage Vo.

In the present embodiment as described above, in the feedback circuit 21 serving as the pulse generator for generating the pulse drive signal Vg whose pulse width varies in response to the output voltage Vo, there are provided the drive circuit 20 serving as the pulse generating means for generating the pulse drive signal Vg when an input voltage exceeds a predetermined threshold value Vd_th, the threshold voltage regulating means 52 for regulating the voltage level of the threshold value Vd_th in response to the output voltage Vo, and the time control circuit 18 for generating the control signal Vd serving as the pulse generating signal for making the voltage level rise aslope or fall aslope as time goes on to regulate the pulse width of the pulse drive signal Vg by making the control signal Vd into the input voltage.

In this instance, the control signal Vd supplied from the time control circuit 18 to the drive circuit 20 rises aslope or falls aslope. The voltage level of the threshold value Vd_th set in the drive circuit 20, however, varies in response to the output voltage Vo under monitoring. Hence, even if the control signal Vd is obtained based on the pulse dividing signals Vm, Vs that vary by the unit time (the clock pulse duration $T_{clk}$), the pulse-width control for varying pulse duration in increments of a time length shorter than the unit time is possible independently of this unit time.

Meantime, the present invention is not limited to the embodiments described above and various modifications are possible within the scope of the gist of the present invention. For example, the circuitry of the time control circuit 18 is not restricted to each of the embodiments and therefore any circuitry may be available that can make the time width of the pulse drive signal Vg vary in increments of a time length shorter than the clock pulse duration $T_{clk}$ of the pulse width finely dividing signal Vs. Further, whilst in the present embodiments, the on pulses of the pulse width finely dividing signal Vs and pulse width roughly dividing signal Vm are mainly used, off pulses may be applicable. Similarly, with regard to the control signal Vd, the voltage level may be reversed relatively to that shown in the figures.

INDUSTRIAL APPLICABILITY

The pulse generator of the present invention is applicable to a control pulse generating means such as a switching regulator, a stepping motor or the like and besides applicable to all the applications that need pulses, a clock signal generation for determining control frequencies of control systems such as a micro computer, a system LSI or the like.

The invention claimed is:

1. A pulse generator for generating a control pulse that varies in pulse width comprising:
   a variable signal output means for outputting pulse width dividing signals whose pulse time widths vary in increments of a unit time,
   a time control means for detecting variations in time widths of said pulse width dividing signals to vary a pulse width of said control pulse in increments of a time length shorter than the unit time, wherein
   the pulse width dividing signals output from said variable signal output means comprise:
   a pulse width roughly dividing signal with a time width approximately equal to a pulse width of said control pulse and
   a pulse width finely dividing signal for regulating the pulse width of said control pulse by said unit time,
   wherein said time control means roughly determines the pulse width of said control pulse by means of said pulse width roughly dividing signal and then finely regulates the pulse width of said control pulse in increments of a time length shorter than said unit time by means of said pulse width finely dividing signal.

2. The pulse generator according to claim 1, wherein said variable signal output means outputs said pulse width finely dividing signal ahead of said pulse width roughly dividing signal, while said time control means regulates a pulse width of said control pulse in increments of a time length shorter than said unit time after said pulse width roughly dividing signal has been output.

3. The pulse generator according to claim 2, further comprising a pulse generating means for generating said control pulse when an input voltage exceeds a predetermined threshold value,
   wherein when said pulse width roughly dividing signal begins to be output, said time control means generates a pulse generating signal for raising, at a predetermined gradient, a voltage level depending on said pulse width finely dividing signal with said pulse generating signal superposed on the voltage level and then said time control means regulates a pulse width of said control pulse in increments of a time length shorter than said unit time by turning the pulse generating signal into said input voltage.

4. The pulse generator according to claim 3, wherein said time control means is provided with a bias voltage generating means for generating a voltage level depending on said pulse width finely dividing signal when said pulse width roughly dividing signal begins to be output.

5. The pulse generator according to claim 2, further comprising a pulse generating means for generating said control pulse when an input voltage exceeds a predetermined threshold value, wherein when said pulse width roughly dividing signal begins to be output, said time control means generates a pulse generating signal for lowering a voltage level from a peak value that exceeded the threshold value, at a predetermined gradient, depending on said pulse width finely dividing signal with said pulse generating signal superposed on the voltage level and then said time control means regulates a pulse width of said control pulse in increments of a time length shorter than said unit time by turning the pulse generating signal into said input voltage.

6. The pulse generator according to claim 5, wherein said time control means is provided with a bias voltage generating means for generating a voltage level depending on said pulse width finely dividing signal when said pulse width roughly dividing signal begins to be output.

7. A pulse generator for generating a control pulse that varies in pulse width comprising:

a variable signal output means for outputting a pulse width roughly dividing signal with a time width approximately equal to a pulse width of said control pulse and a pulse width finely dividing signal whose phase difference from a phase of said pulse width roughly dividing signal varies by a unit time, and a time control means for roughly determining the pulse width of said control pulse and detecting variations in said phase difference to vary a pulse width of said control pulse in increments of a time length shorter than said unit time.

* * * * *